Aug. 26, 1952  T. R. FINLAYSON ET AL  2,608,418
COLLAPSIBLE BOAT TRAILER

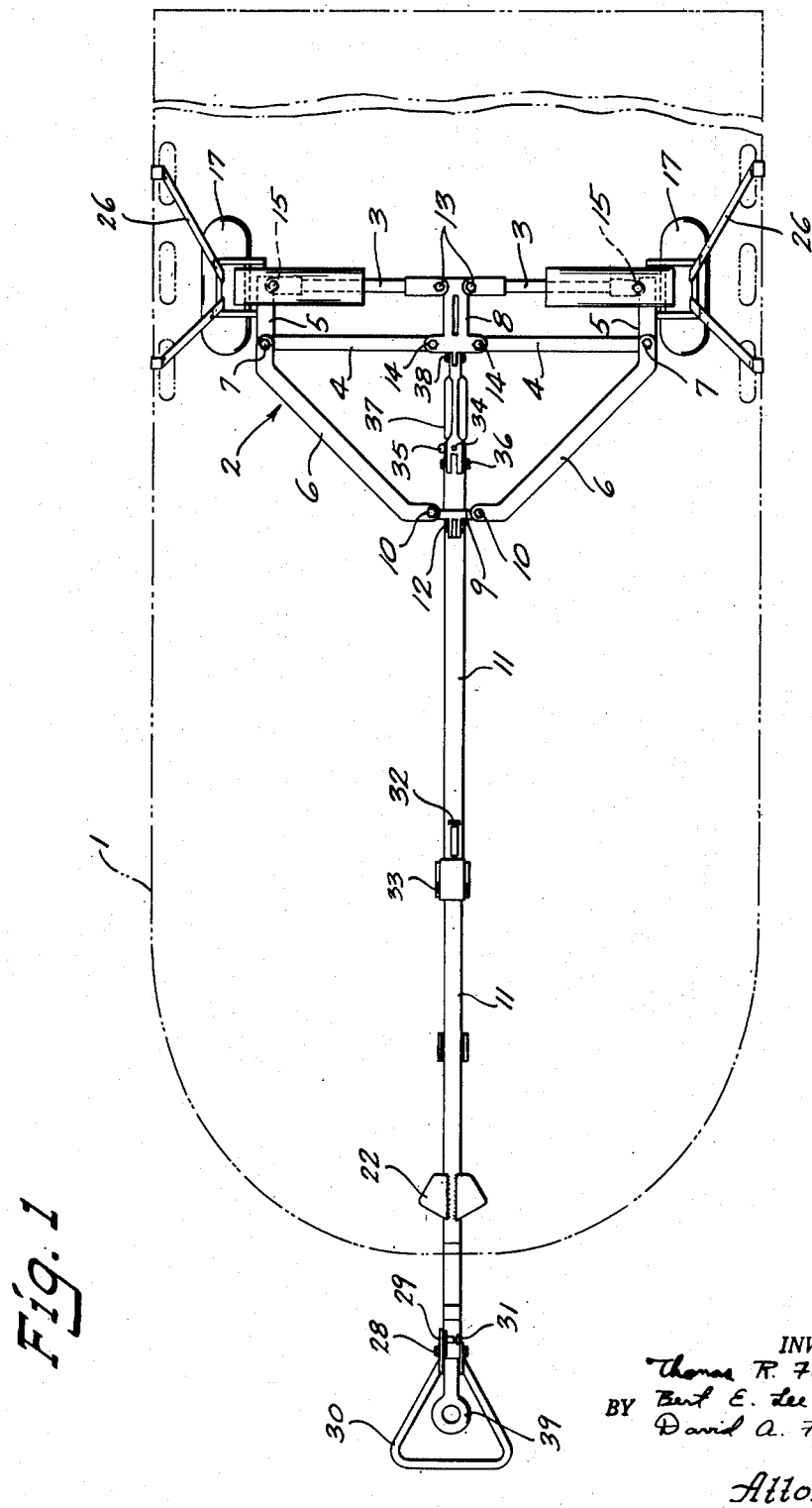

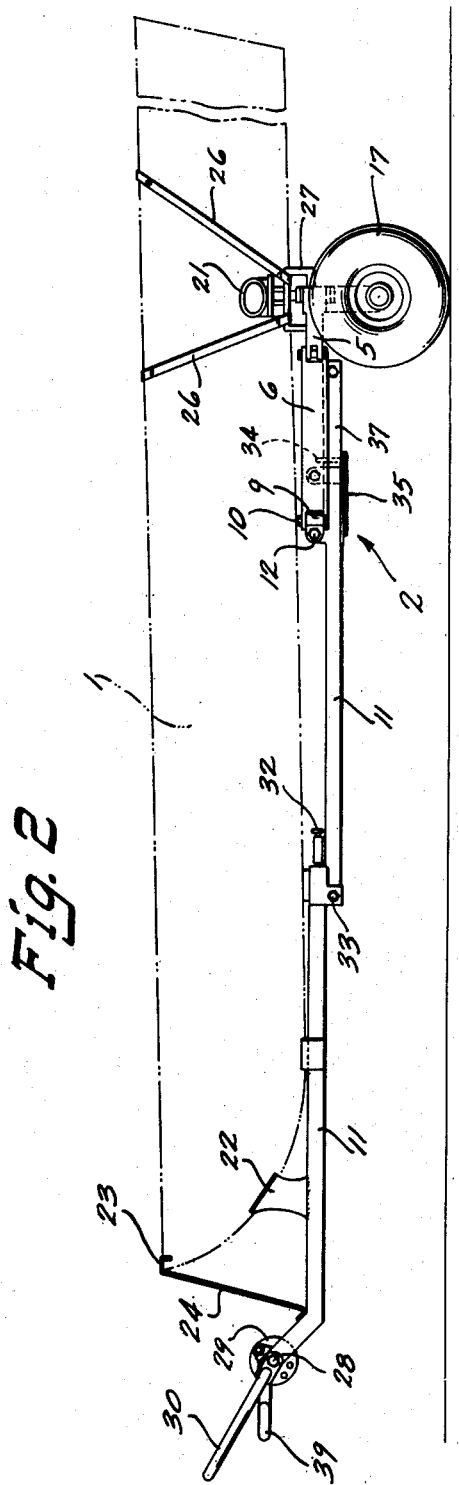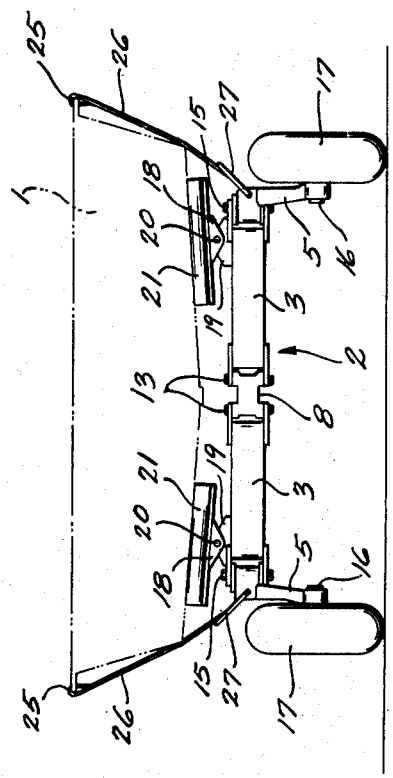

Filed Oct. 30, 1950  3 Sheets-Sheet 3

INVENTORS
Thomas R. Finlayson
Bert E. Lee
BY David A. Fox

Attorney

Patented Aug. 26, 1952

2,608,418

UNITED STATES PATENT OFFICE 2,608,418

COLLAPSIBLE BOAT TRAILER

Thomas R. Finlayson and Bert E. Lee, Milwaukee, Wis., assignors to Magnesium Products of Milwaukee, Milwaukee, Wis., a corporation of Wisconsin Application October 30, 1950, Serial No. 192,872

3 Claims. (Cl. 280—42)

This invention relates to improvements in collapsible vehicles and more particularly resides in a vehicular trailer frame composed of interconnecting segments adapted to collapsibly fold from an extended position to a position of small overall dimension.

An important object of this invention is to provide a collapsible trailer having a tongue so interlinked with the other segments comprising the frame of the trailer that the same may be employed also as an operating lever capable of providing sufficient leverage to permit an operator to quickly and easily collapse a trailer of substantial size such as may be adapted for the transport of boats and other small craft.

A further object of the invention is to provide a trailer which may be folded into a compact form in which the wheels remain operative as well as in the extended position of the trailer.

These and other objects will appear in the description to follow.

In the description reference is made to the accompanying drawings in which there is shown by way of illustration and not of limitation one form of this invention.

In the drawings:

Fig. 1 is a plan view of a trailer embodying this invention,

Fig. 2 is a side view in elevation of the trailer depicted in Fig. 1,

Fig. 3 is a rear end view in elevation of the trailer depicted in Fig. 1,

Figure 4:
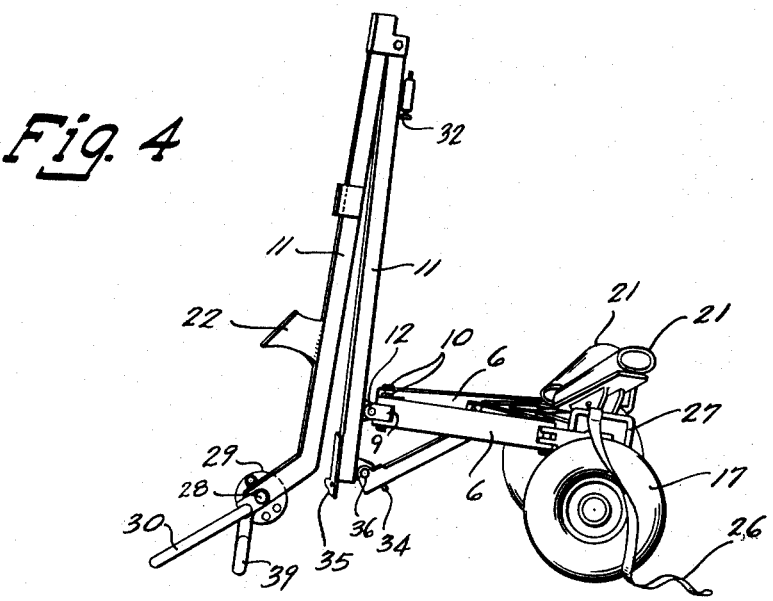
Fig. 4 is a side view in perspective of the trailer depicted in Fig. 1 shown in a partially collapsed position.

Referring now to the drawings, there is shown in Figs. 1, 2 and 3 a boat 1 outlined in broken lines supported on a trailer designated generally by the numeral 2. The trailer 2 comprises a longitudinal hinged shaft foldable at predetermined hinge points, as will be described hereinafter, and a transverse foldable axle assembly. The axle assembly is formed in the main of two parallelogram link systems placed symmetrically on either side of the longitudinal center line of the trailer the same being made up of transverse rear links 3, transverse forward links 4, wheel spindle members 5 which form the longitudinal outer sides of each parallelogram and a common center longitudinal member 8. The inner ends of the links 4 are pivotally joined to the center member 8 by vertical pins 14 while the outer ends of the links 4 join pivotally with the spindle members 5 through vertical pins 7. In similar fashion the inner ends of links 3 join pivotally with the center member 8 through vertical pins 13 while the outer ends of said links join with the spindle members 5 through vertical pins 15.

For the purpose of holding the parallelogram link system in rectangular or extended position, two oblique brace members 6 are provided which are pivotally connected respectively at their outer ends to the outer extremity of the respective links 4 by vertical pins 7 from whence they converge forwardly and pivotally connect respectively at their inner ends to a T-shaped bracket 9 by vertical pins 10. The bracket 9 is pivotally joined to a tongue 11 that forms a part of the longitudinal shaft of the trailer by a horizontal pin 12 which is disposed forwardly of the rear end of the tongue 11 a predetermined distance to provide a short overhang at the rear of the tongue 11. The rear end of the tongue 11 is pivotally joined by a horizontal pin 36 with the forward end of a longitudinal link 37 joined at its rear end with the forward end of longitudinal member 8 by a horizontal pin 38. With the tongue 11 and the link 37 in alignment the links 4, the links 6 and the tongue 11 and link 37 provide two triangular arrangements which act rigidly to maintain the axle assembly in extended position.

Figure 5:
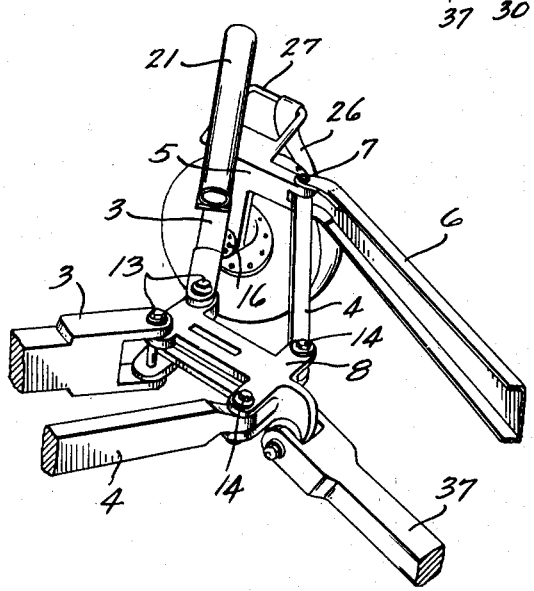
Fig. 5 is a fragmentary view in perspective of the trailer depicted in Fig. 1 showing a wheel mounting assembly in a partially collapsed position.

As shown in Figs. 2, 3 and 5 wheel spindle members 5 are formed with downwardly extending legs carrying at the lower extremities thereof spindles 16 on which wheels 17 are mounted for rotation.

As more clearly appears in Fig. 3, tiltable bolsters 18 are rockably secured to bolts 20 carried by legs 19 which project upwardly from and are secured to the rear links 3. The upper surface of each of bolsters 18 is provided with cylindrical rubber cushions 21 to provide a distributed support that will conform with the shape of the load to be carried.

Near the forward end of the longitudinal hinged tongue 11 and extending upwardly therefrom is a cushioned cradle support 22 shaped so as to support the bow of the boat 1. To hold boat 1 in contact with support 22 a hook 23 and an adjustable strap 24 of leather or suitable fabric are provided as is shown in Fig. 2. The stern of boat 1 is held in contact with the pads 21 by means of adjustable straps 26 fastened to bars 27 and which are provided with hook ends 25 that clasp the gunwales of the boat 1.

Swingably secured to the forward end of the tongue 11, by means of a bolt 28 is the cam plate 29 to which is attached a triangular handle 30 adapted for hand towing. Handle 30 may be swung through an arc of at least 180 degrees and locked at any desired angle by means of a spring loaded pin 31. For automotive power towing a ring eye 39 is rigidly secured to the forward end of tongue 11.

The tongue 11 forming the main portion of the longitudinal extent of the trailer is of two segments hinged together by pin 33. When in lengthwise extended position the segments of the tongue 11 are rigidly held in such position by means of a spring loaded pin 32 carried by the after segment that engages an indentation in the forward segment.

For the purpose of releasably maintaining alignment between the tongue 11 and the member 37 a pin 34 is affixed to member 37 so as to project slightly therefrom in position to be received within a hole in a flat spring 35 secured at its forward end to tongue 11. When the spring 35 is bent away from the tongue 11 the pin 34 is disengaged and hinging between the tongue 11 and link 37, about the pin 36, is permitted.

When boat 1 is removed from the trailer and it is desired to collapse the trailer spring loaded pin 32 is released and the forward section of tongue 11 is allowed to swing downwardly. Flat spring 35 is then released from the fixed pin 34 by depressing the spring 35 and the portion of tongue 11 which is forward of the bolt 12 is lifted upwardly.

The after segment of tongue 11 thus acts as a lever with its fulcrum at bolt 12 and through a toggle action between the overhanging part of tongue 11 and the link member 37, causes the central member 8 of the axle assembly to be drawn forwardly toward the bracket 9. As a result the axle assembly and brace members 6 fold backwardly and inwardly to a compact position. The parallelogram or pantograph construction of the apparatus maintains the wheels 17 in parallel relationship to one another at all times as shown in Fig. 4.

Figure 6:
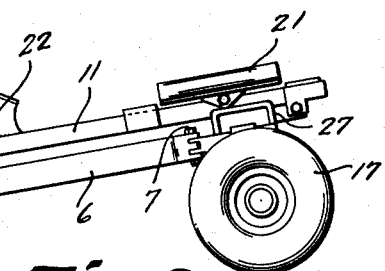
Fig. 6 is a side view in elevation of the trailer depicted in Fig. 1 shown in fully collapsed position.

Proceeding from the jackknifed position shown in Fig. 4 further clockwise rotation of tongue 11 about the pin 12 causes opposing links 3 and opposing links 4 to further fold toward each other until the members 6, 4, 3 and 5 are in a position parallel to tongue 11. The trailer may then be held in a fully collapsed position, as shown in Fig. 6, by swinging the handle 30 into a position below member 37.

In collapsing or opening the trailer described considerable mechanical advantage is available to the operator permitting a person to manually collapse or open a trailer of substantial size without assistance. Such an advantage is had by reason of the lever action of the rear segment of the tongue 11.

In the embodiment of the invention shown, in which the trailer is collapsible to the fullest extent, a certain relationship in the lengths of the various members is required. For example, the excess in the effective lengths of the links 6 over the lengths of their corresponding links 4 must be substantial equal to the excess in length of link 37 over the length of the overhanging part of tongue 11 between pins 12 and 36. Where the fullest possible collapsing is not required this relationship need not be adhered to.

I claim:
1. In a collapsible vehicle the combination comprising a longitudinal tongue having a forward hitch end and a rear end; a transverse pivot mounting secured to said tongue near the rear end thereof to provide a short overhanging portion at the rear end of said tongue; a transverse axle assembly disposed rearwardly of the rear end of said tongue and comprising a longitudinal center member, forward and rear right and left hand vertical pivot mountings on said center member, forward and rear horizontally swinging right and left hand lateral links pivotally engaging respectively said forward and rear right and left hand pivot mountings on said center member, right and left wheel spindle side members each having spaced forward and rear vertical pivot mountings pivotally engaging respectively the outer ends of said forward and rear right and left hand lateral links to form therewith and with said center member two symmetrical horizontally swinging parallelogram link systems, said wheel spindle side members each having a wheel spindle extending outwardly therefrom; a wheel mounted on each of said spindles; a right hand and a left hand divergent brace member each being longer than said lateral links and each being pivotally connected at its rear end respectively with the forward pivot mounting of said right and left hand wheel spindle members, each of said divergent braces being provided with horizontally swingable pivot means at the forward ends thereof, said horizontally swingable pivot means being secured in pivotal relation to said tongue near said transverse pivot mounting on said tongue; a toggle link pivotally connected at its forward end to the rear end of said tongue and pivotally connected at its rear end to said axle center member; and releasable latching means engaging said tongue and toggle link adapted to be engaged to maintain the same in rigid endwise alignment with one another and with said parallelogram link systems in substantially transverse relation to said tongue and adapted to be released whereby said tongue may be swung upwardly and rearwardly to draw said toggle link and said axle center member forwardly to swing said parallelogram link systems inwardly to sidewardly collapse the same.

2. A collapsible trailer in accordance with claim 1 wherein the length of the toggle link exceeds the length of the overhanging portion of the tongue measured between pivotal points by an amount equal to the excess in length of the divergent brace members over the length of the lateral link members.

3. In a collapsible vehicle the combination comprising a longitudinal tongue having a forward hitch end and a rear end, a transverse pivot mounting secured to said tongue near the rear end thereof to provide a short overhanging portion at the rear end of said tongue, a pair of wheels rotatably mounted in parallel spaced relationship, a supporting frame for said wheels comprising a pair of pivotally mounted symmetrical link systems transversely disposed and horizontally swingable with respect to a common center member, diverging brace members each pivotally connected at its rear end to one of said pair of link systems and being provided with horizontally swingable pivot means at the forward end thereof, said horizontally swingable pivot means being secured to said transverse pivot mounting, a longitudinally disposed toggle link pivotally connected at its forward end to the rear end of said tongue and pivotally connected at its rear end to said center member, and releasable latching means engaging said tongue and engaging means joined with said center member adapted to be engaged to maintain the same rigid with one another and with said swingable link systems in substantially transverse relation to said tongue and adapted to be released whereby said tongue may be swung vertically to draw said toggle link and said center member forwardly to swing said link systems to sidewardly collapse the same.

THOMAS R. FINLAYSON.
BERT E. LEE.

REFERENCES CITED

The following references are of record in the file of this patent:

FOREIGN PATENTS

| Number | Country | Date |
|--------|---------|------|
| 25,897 | Australia | Mar. 28, 1930 |